Patented Aug. 14, 1945

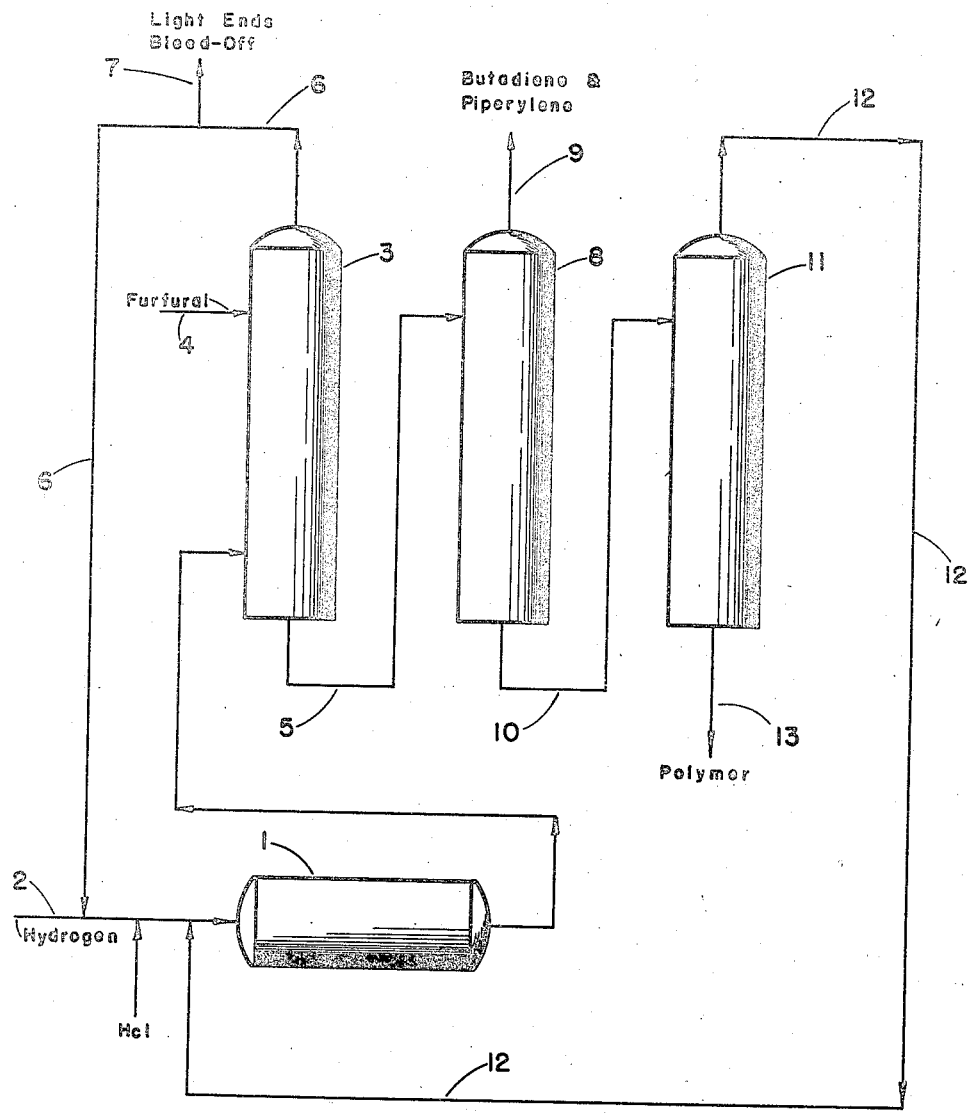

2,382,749

UNITED STATES PATENT OFFICE 2,382,749

PRODUCTION OF DIOLEFINS

Henry M. Singleton, Goose Creek, Tex., assignor to Standard Oil Development Company, a corporation of Delaware Application February 15, 1943, Serial No. 475,867

3 Claims. (Cl. 260—681)

The present invention is directed to a method for producing diolefins from heterocyclic ring compounds containing conjugated double bonds.

According to the present invention diolefins are prepared by subjecting an organic compound of the type generally referred to above to hydrogenation under conditions suitable for breaking the ring structure of the compounds. The ring structure of these compounds is quite stable to ordinary hydrogenating treatment, but when subjected to elevated temperatures of the order of 800° to 1400° F. in the presence of suitable catalysts, it tends to break down while retaining its conjugated double bond linkage.

The conventional dehydrogenation catalysts are useful in this reaction, particularly those which are immune from poisoning by sulfur. Suitable catalysts are referred to in U. S. Patent 2,126,817. In addition to the catalysts there referred to, it is advantageous to include in the catalyst a splitting component, such as metallic copper or other free metal. The reaction may be promoted by the addition to the reaction mixture of a small amount of an acidic substance, such as hydrochloric acid or similar inorganic acid, which may be injected into the feed line to the catalytic chamber.

It is preferred to use a fairly high pressure in the reaction chamber. Preferably, the pressure is supplied in the form of partial pressure of hydrogen, although, if desired, inert gases may be included in the reaction mixture if it is desired to use a low partial pressure of hydrogen.

Typical examples of organic compounds which may be employed in the process of the present invention are furan, thiophene, and pyrrole, and derivatives of these compounds in which the conjugated double bond linkage is preserved. Compounds which are readily available and are satisfactory for use are furfuraldehyde and furfuryl alcohol.

The most difficult part of the conversion process involved is the splitting out from the ring compound of the element other than carbon and hydrogen in the three specific examples referred to. The hydrogen will combine readily with this element, which is either atomic oxygen, atomic sulfur, or the radical NH. Therefore, it is preferred to conduct the reaction on the shock principle, which means that the compound, in admixture with hydrogen, is suddenly subjected to rigorous conditions, allowed to remain under these conditions for a short time, and then quickly restored to milder conditions. Thus, the reaction chamber may be maintained at a temperature between about 1100° and 1300° F. and the reaction mixture passed through it rather rapidly. A contact time of one-half to thirty seconds under these conditions yields satisfactory results. The reaction chamber can be suddenly chilled by being subjected to a spray of cold liquid. If desired, the fresh feed may be used as the chilling liquid.

The nature and objects of the present invention will be more readily understood from the following detailed description of the accompanying drawing, in which the single figure is a front elevation, in diagrammatic form, of one type of apparatus which may be utilized in the practice of the present invention.

Referring to the drawing in detail, numeral 1 indicates a reaction vessel in which the hydrogenation step of the present invention is performed. As will be understood, this vessel is provided with a suitable packing of catalytic material, which may be arranged in any of the ways well known in the art to provide the most efficient contact time between the catalyst and the reactants. Hydrogen is introduced into this vessel through line 2.

The effluent from the hydrogenation vessel 1 is discharged into a spray tower 3, into the top of which the organic compound to be hydrogenated, as for example, furfural, is sprayed in liquid form through line 4. The tower 3 will preferably be provided with internal equipment to insure thorough mixing of the gaseous effluent from vessel 1 and the fresh feed. The C-4 and heavier hydrocarbons condense in the tower 3 and pass out of the bottom thereof with the furfural through line 5, while the lighter constituents, including the residual hydrogen, leave the top of tower 3 through line 6, by which they are returned to the feed line 2. If desired, some of these light ends may be bled off through line 7. The mixture carried by line 5 is discharged into a fractionating tower 8 which is so operated that the desired diolefins are recovered overhead through line 9. In this case the olefins produced are butadiene and piperylene. The residue is removed from tower 8 as bottoms by line 10, which conducts this residue to a second fractionating tower 11, which is so operated that furfural and everything boiling lower than it passes off overhead through line 12, while polymeric compounds are recovered as bottoms through line 13. It may be observed at this point that tower 11 may be omitted entirely from the system if desired, its only purpose being to reduce coking in the hydrogenation zone. Line 12 carries the overhead from tower 11 back to feed line 2, where it is introduced into the hydrogenating zone 1. Line 2 is also provided with a branch line 14 which may be utilized for the introduction into the feed of an accelerator, such as hydrogen chloride.

The nature and objects of the present invention having been thus described and illustrated, what is claimed as new and useful and is desired to be secured by Letters Patent is:

1. A method for producing a diolefin which comprises subjecting a heterocyclic compound of the furan series to a temperature between 800° F. and 1400° F. to the action of a dehydrogenation catalyst in the presence of an excess of hydrogen and a small amount of an acidic substance for a period between 0.5 and 30 seconds to effect scission of the ring structure and recovering by distillation of the resulting product a diolefin having at least four carbon atoms in the molecule.

2. A method for producing diolefins from a heterocyclic organic compound of the furan series having a conjugated double bond linkage which comprises subjecting the compound to the action of a dehydrogenation catalyst at a temperature between about 1100° and 1300° F. in the presence of an excess of hydrogen and a small amount of an acidic substance for a period between .5 and 30 seconds to effect scission of the ring structure, shock-chilling the reaction mixture at the end of the reaction period and recovering a diolefin having at least four carbon atoms in its molecule from the shock-chilled mixture.

3. A method according to claim 2 in which the catalyst contains a free metal capable of catalyzing the cracking of hydrocarbons.

HENRY M. SINGLETON.